No. 843,414. PATENTED FEB. 5, 1907.
E. F. NORTHRUP.
OPTICAL READING DEVICE FOR ELECTRICAL MEASURING INSTRUMENTS.
APPLICATION FILED MAR. 27, 1906.
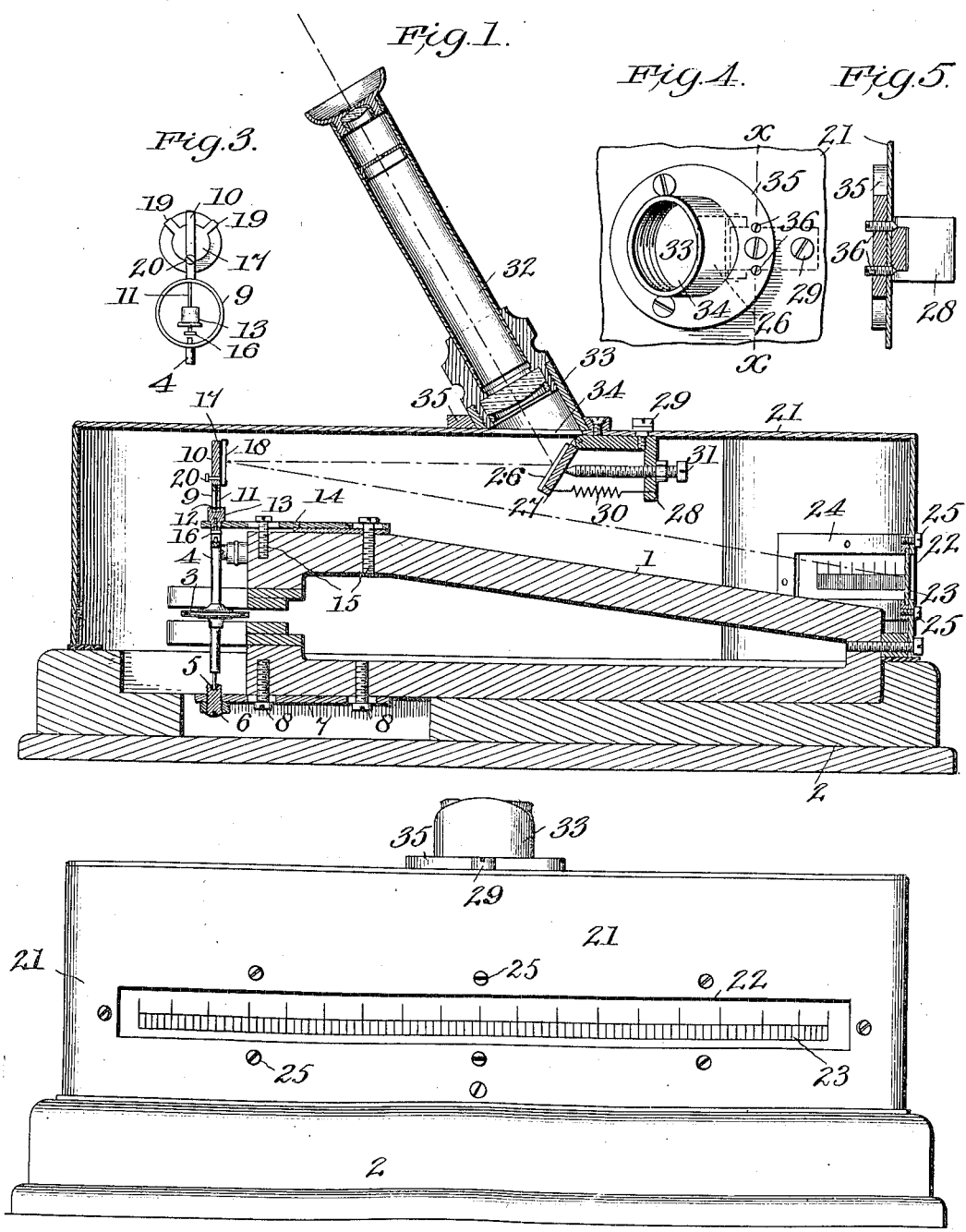

UNITED STATES PATENT OFFICE.

EDWIN F. NORTHRUP, OF PHILADELPHIA, PENNSYLVANIA, ASSIGNOR TO LEEDS AND NORTHRUP COMPANY, OF PHILADELPHIA, PENNSYLVANIA, A CORPORATION OF PENNSYLVANIA.

OPTICAL READING DEVICE FOR ELECTRICAL MEASURING INSTRUMENTS.

No. 843,414.      Specification of Letters Patent.      Patented Feb. 5, 1907.

Application filed March 27, 1906. Serial No. 308,368.

*To all whom it may concern:*

Be it known that I, EDWIN F. NORTHRUP, a citizen of the United States, residing at Philadelphia, in the county of Philadelphia and State of Pennsylvania, have invented certain new and useful Improvements in Optical Reading Devices for Electrical Measuring Instruments, of which the following is a specification.

The chief advantages of a mirror and telescope for reading the scale of deflection electrical measuring instruments are that by means of these the real angle of deflection is effectively doubled and double sensibility is thus obtained. Therefore much more accurate readings may be made and much smaller deflections observed than by reading directly with the naked eye an index movable over a scale. These advantages have long been known, and it is the universal practice to employ a mirror and telescope in reading the scale of laboratory instruments, such as D'Arsonval galvanometers and other deflection instruments not of a portable nature.

The primary object of this invention is to embody in a portable instrument the advantages as to scale-reading now possessed by instruments of a purely laboratory or non-portable type. This I accomplish in one way by the invention herein described and shown in the accompanying drawings, in which—

Figure 1 represents in central vertical section an instrument embodying my present invention; Fig. 2, a front elevation of the same the with telescope broken away; Fig. 3, a detail view in elevation showing the manner of mounting one of the mirrors and supporting the moving system; Fig. 4, a fragmentary top plan view with the telescope removed to show the arrangement of the other mirror and mode of adjusting the same, and Fig. 5 a section along the line *x x* of Fig. 4 looking to the left.

In the accompanying drawings, 1 represents the field-magnet of a portable deflection electrical measuring instrument, such as a galvanometer, voltmeter, ammeter, ohmmeter, or other instrument; 2, a wooden or other suitable base, upon which said magnet is mounted, and 3 the moving system, which in the case shown, is of the flat-coil type mounted on a vertical shaft 4 for deflective movement in a horizontal plane between the poles of the magnet 1. The specific construction of the moving system and magnet form no part of my present invention and may be of the type indicated or of the well-known Weston type or modification thereof or any other suitable type.

In the drawings I have shown the lower end of the shaft 4 mounted in a jewel-bearing 5, carried by a screw 6 in an adjustable plate 7, secured to the magnet 1, as by screws 8. The upper end of the shaft 4 carries a ring 9, having at its top an upright extension 10 and a depending pivot 11, which latter rests in a jewel-bearing 12 in a stud 13, carried by a plate 14, adjustably secured to the top of the magnet 1, as by screws 15. A small screw 16 in the lower end of the stud 13 acts to limit the vertical movement of the shaft 4. I do not, however, confine my invention to the specific way of mounting the system herein shown.

To the upright 10 is secured a thin light metal plate 17, the object of which is to support a mirror 18, which it does by means of ears 19, bent over the edge of the mirror, as shown. The angular adjustment of the mirror 18 may be effected by means of a small screw 20, passing through the upright 10 and engaging the back of the mirror, as shown. Any other suitable means for imparting deflective movement from the moving system to the mirror may be employed without departing from the spirit of my invention.

Inclosing the parts thus far described, with the exception of the base 2, upon which it rests, is a metallic or other cover 21 of any desired shape, and in one end of this cover is an elongated opening 22, on the inside of which is mounted a scale 23, preferably of celluloid or other translucent material, held in position by clamping-pieces 24, secured to the inside of the cover by means of screws 25. This scale is located in the arc of a circle struck with a center coincident with the vertical axis of the moving system. The scale may be graduated in any desired quantities, either electrical or other. For example, if the instrument is employed in the measurement of temperatures, the scale would be graduated in degrees of temperature.

The mirror 18 is adjusted to receive the image of the scale 23 and to reflect the same into a second mirror 26, secured to a supporting-plate 27, hinged to a bracket 28, secured to the inside of the top of the cover 21, as by screw 29, upon which the said bracket may be turned horizontally as a pivot. The plate 27 is held under the tension of a spring 30 or otherwise against an adjusting-screw 31 in the bracket 28, by which arrangement the angular vertical adjustment of the mirror 26 may be effected. The angular horizontal adjustment of the mirror 26 on screw 29 may be effected by the two small tapered adjusting-screws 36. (See Figs. 4 and 5.) The mirror 26 is arranged to reflect the image of the scale 23 into a telescope 32, one end of which is screwed into a slanting collar 33, mounted upon the top of the cover 21 and registering with an opening 34 therein. The collar 33 is held rigidly upon the cover 21 by means of a ring 35, screwed or otherwise attached to the top of the said cover.

The telescope may be of any desired construction and may be mounted upon the cover in any desired way.

What I claim is—

1. In an electrical measuring instrument, the combination with a moving system, of a mirror mounted for angular movement by said system, a cover for said instrument, a scale mounted to be reflected by said mirror, a mirror mounted to receive the reflected image of said scale from the first mirror, and a reading-telescope mounted to receive the reflected image of said scale from the second-mentioned mirror, the said telescope being directed away from the movable mirror, and in the direction of said scale, and the longitudinal axis of said telescope lying in a plane which intersects said scale.

2. In an electrical measuring instrument, the combination with a moving system, of a mirror mounted for angular movement by said system, a cover for said instrument, a scale mounted on said cover to be reflected by said mirror, a mirror mounted to receive the reflected image of said scale from the first mirror, and a reading-telescope mounted on the outside of said cover to receive the reflected image of said scale from the second-mentioned mirror, the said telescope being directed away from the movable mirror and in the direction of said scale, and the longitudinal axis of said telescope lying in the plane which intersects said scale.

3. An electrical measuring instrument, comprising a moving system, a mirror mounted for angular movement by said system, a scale mounted to be reflected by said mirror, a mirror mounted to receive the reflected image of said scale from the first mirror, a cover inclosing said system and mirrors, and a reading-telescope mounted upon the outside of said cover to receive the reflected image of said scale from the second-mentioned mirror, the axis of rotation of the first-mentioned mirror and longitudinal axis of said telescope and the center of said scale lying in substantially the same plane, and the telescope directed away from said movable mirror and toward said scale.

4. An electrical measuring instrument, comprising a moving system, a mirror mounted for angular movement by said system, a cover inclosing said system and mirror and having an opening in its top, a scale mounted to be reflected by said mirror, a mirror mounted within said cover to receive the image of said scale reflected by the first-mentioned mirror, and a reading-telescope mounted on the outside of said cover and registering with said opening in the top thereof to receive the image of said scale reflected by the second-mentioned mirror, the axis of rotation of the first-mentioned mirror and longitudinal axis of said telescope and the center of said scale lying in substantially the same plane, and the telescope directed away from said movable mirror and toward said scale.

5. An electrical measuring instrument, comprising a moving system, a mirror mounted for angular movement by said system, a cover inclosing said system and mirror, a scale mounted within said cover to be reflected by said mirror, a mirror mounted on the inside of said cover to receive the reflected image of said scale from the first-mentioned mirror, said mirror being angularly adjustable from the outside of said cover and a reading-telescope adapted to receive the reflected image of said scale from the second-mentioned mirror and having its eye-piece outside of said cover.

6. An electrical measuring instrument, comprising an electromagnetically movable system, a mirror mounted for angular movement by said system, a cover inclosing said system and mirror and having an elongated opening in one end and an opening in its top, a scale mounted to register with said elongated opening and to be reflected by said mirror, a mirror mounted within said cover to receive the reflected image of said scale from the first-mentioned mirror and angularly adjustable in two directions, and a reading-telescope mounted on the outside of said cover to register with the opening in the top thereof and adapted to receive the reflected image of said scale from the second-mentioned mirror, the axis of rotation of the first-mentioned mirror and longitudinal axis of said telescope and the center of said scale lying in substantially the same plane, and the telescope directed away from said movable mirror and toward said scale.

7. An electrical measuring instrument, comprising a movable system, a mirror mounted for angular movement by said system, a cover inclosing said system and mirror and having an elongated opening at one end and an opening through its top, a scale mounted to register with said elongated opening and to be reflected by said mirror, a bracket pivotally secured to the inside of said cover and provided with means to adjust the angular position of the same on said pivot, a support hinged to said bracket, means to maintain said support in a slanting position and to adjust the angle thereof, a mirror mounted on said support to receive the reflected image of said scale from the first-mentioned mirror, a slanting collar mounted on top of said cover and registering with the said opening therein, and a telescope adapted to be secured to said collar, and arranged to receive the reflection of said scale from the last-mentioned mirror.

8. An electrical measuring instrument, comprising an electromagnetically movable system, a mirror mounted for angular movement by said system, a cover inclosing said system and mirror and having an elongated opening at one end and an opening through its top, a scale mounted to register with said elongated opening and to be reflected by said mirror, a bracket pivotally secured to the inside of said cover and provided with means to adjust the angular position of the same on said pivot, a support hinged to said bracket, means to maintain said support in a slanting position and to adjust the angle thereof, a mirror mounted on said support to receive the reflected image of said scale from the first-mentioned mirror, a slanting collar mounted on top of said cover and registering with the said opening therein, and a telescope adapted to be secured to said collar, and arranged to receive the reflection of said scale from the last-mentioned mirror.

9. The combination with a moving system, of a mirror mounted for angular movement by said system, a cover inclosing said parts and having an elongated opening, a translucent scale registering with said opening and adapted to be reflected by said mirror, a second mirror mounted inside of said cover to receive the image of the scale reflected from the first mirror, a reading-telescope mounted on the top of said cover to receive the image of said scale reflected from the second mirror and having its eye-piece on the outside of said cover, the longitudinal axis of said telescope lying in a plane which intersects said scale.

In testimony whereof I affix my signature in presence of two witnesses.

EDWIN F. NORTHRUP.

Witnesses:
JULIUS BERNSTEIN,
W. L. SWETLAND.